April 23, 1929.　　　A. HARRISON　　　1,709,980

WATER COOLER AND CHEST

Filed Jan. 26, 1927　　　2 Sheets-Sheet 1

Annie Harrison, Inventor

Witnesses
C. E. Churchman Jr.

By Richard B. Owen
Attorney

April 23, 1929.  A. HARRISON  1,709,980
WATER COOLER AND CHEST
Filed Jan. 26, 1927  2 Sheets-Sheet 2
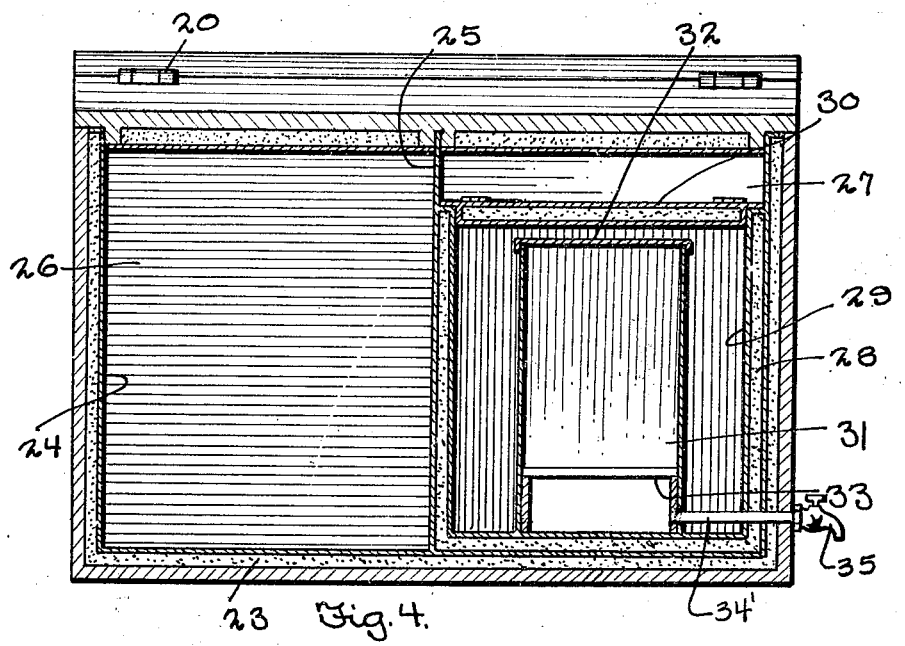
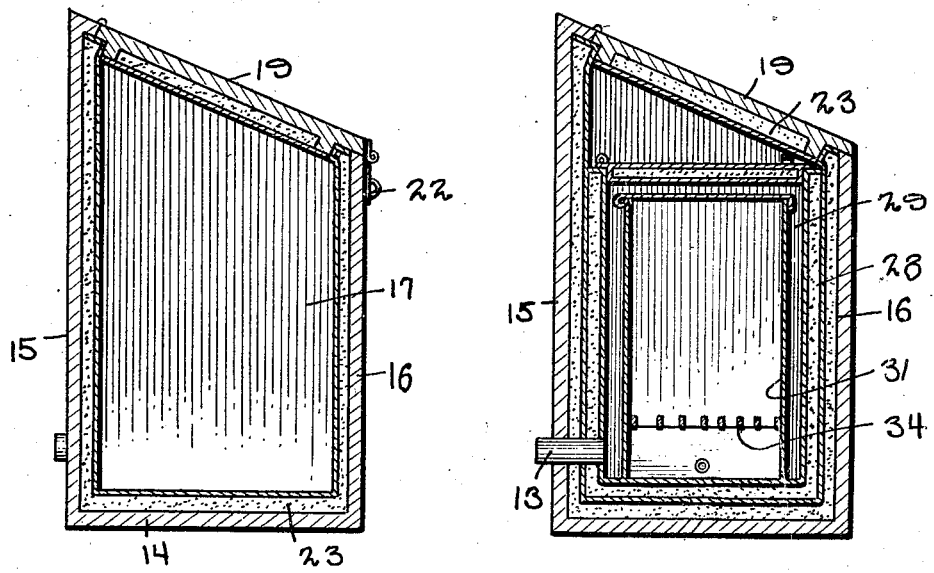
Annie Harrison, Inventor
By Richard B. Owen
Attorney
Witnesses
C E Churchman Patented Apr. 23, 1929.

1,709,980

UNITED STATES PATENT OFFICE.

ANNIE HARRISON, OF MARLOW, OKLAHOMA, ASSIGNOR OF ONE-HALF TO EUNICE McGREGOR, OF MARLOW, OKLAHOMA.

WATER COOLER AND CHEST.

Application filed January 26, 1927. Serial No. 163,808.

The present invention relates to improvement in automobile equipment and has particular reference to an improved storage chest.

An important object of the invention is to provide a storage chest for automobiles and similar vehicles, adapted to carry drinking water and other commodities.

Another object of the invention is the provision of a storage chest adapted for automobiles which is of insulated construction and arranged to carry cold drinking water and food stuffs.

Another object of the invention is the provision of a storage chest of the above character which is formed to provide a water carrying compartment and a food compartment.

Still another object of the invention is the provision of a storage chest of the above type which is designed to be conveniently connected in position on automobiles and arranged to deliver water to a convenient position within the machine.

Another object of the invention is the provision of a chest of the above character which is compact and durable of construction and which can be manufactured at a relatively low cost.

Other objects and advantages of the invention will become apparent as the description progresses.

In the accompanying drawings forming a part of this specification and in which like reference characters are employed to designate corresponding parts throughout the same:

Figure 4 is a vertical longitudinal sectional view taken through the center of the chest.

Figure 5 is a transverse sectional view taken on the line 5—5 of Figure 3, and

Figure 6 is a transverse sectional view taken on the line 6—6 of Figure 3.

Figure 1:
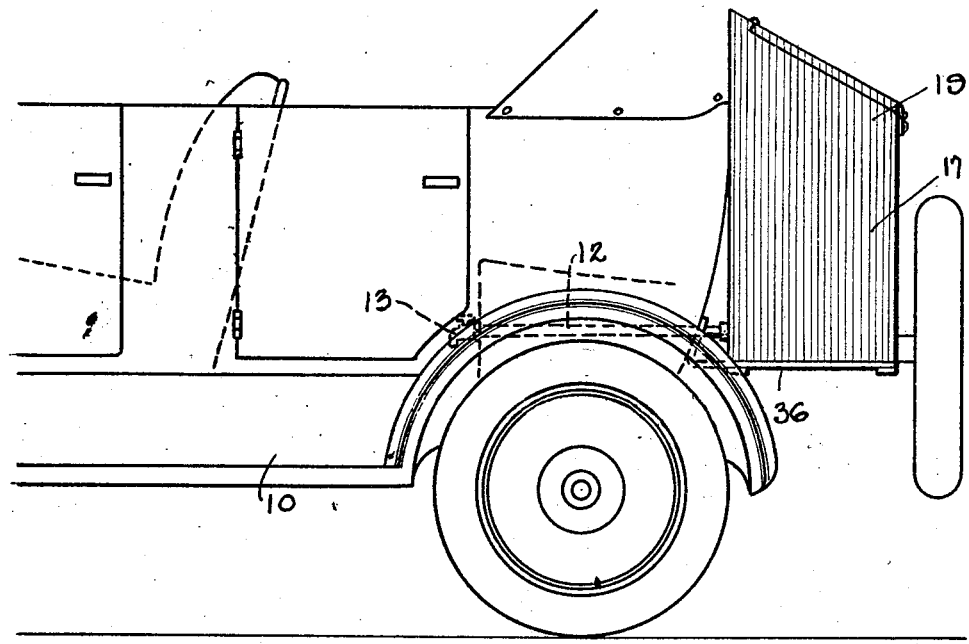
Figure 1 is a fragmentary side elevational view of an automobile showing my improved chest construction mounted in operative position thereon.
Figures 2, 3:
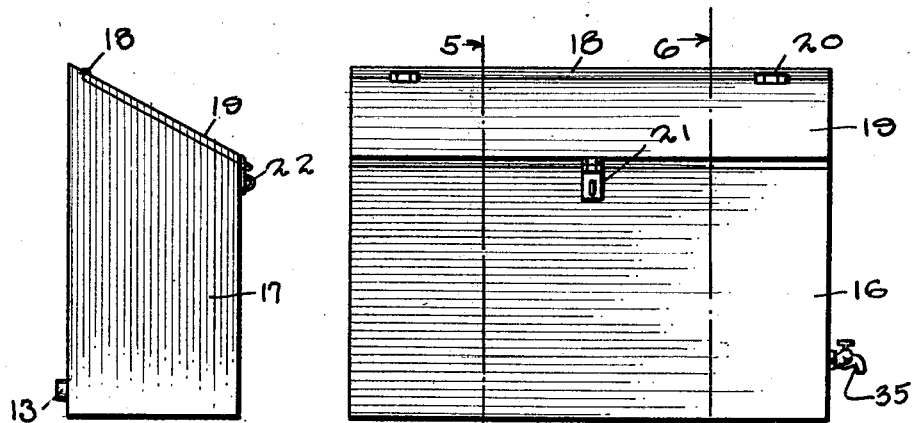
Figure 2 is a side elevational view of the chest.
Figure 3 is a rear elevational view of the chest.

Referring to the drawings, wherein for the purpose of illustration is shown the preferred embodiment of my invention, the numeral 10 generally designates the fragmentary portion of an automobile of conventional construction of the type known as a touring body. In order to permit convenient use of the apparatus while the vehicle is in motion, a conducting pipe is extended below the rear vehicle seat, and a faucet 13 is secured to the inner end. The faucet is arranged against the forward side of the rear seat support as shown in Figure 1.

With particular reference to the construction of my improved chest, I provide an exterior casing of wood construction including a bottom 14, a relatively high back wall 15, a shorter forward wall 16 and side walls 17. The upper edges of the side walls are formed at an angular inclination to conform to the formation of the front and rear walls. Thus, a rectangular casing is formed having the upper side edges sloping downwardly towards the forward end. A transverse strip 18 is secured on the upper edge of the rear wall and a cover 19 is secured to this strip by means of hinges 20. In closed position, the cover is disposed at an inclined position and is secured in position by a pivoted latch bar 21 formed with an elongated flap adapted to engage an ear 22.

The interior of the casing is lined with insulated material, preferably cork as indicated at 23. A metal lining 24 is then secured within the cork filling and a partition 25 of the same material mounted transversely in the center of the casing. This partition divides the casing into two separate compartments, providing a compartment 26 designed to carry food stuffs and miscellaneous articles and a second compartment 27 arranged to form a water cooling compartment. The compartment 27 is provided with a second insulating lining 28 and formed with an inner metal lining 29 for the reception of water. A cover 30 comprising a double metallic plate having a layer of insulating material positioned therebetween is removably fitted on the compartment 27 to cover the water chamber. A receptacle 31 of longitudinal cylindrical formation is formed within the water chamber. This receptacle is preferably of metallic construction and provided with a flanged cover 32. A rack 33 forming a drip pan in the lower end thereof is supported in elevated position in the lower end of the receptacle.

In order to permit convenient drainage of the ice drip pan, a drain pipe 34' is extended laterally through the casing and insulation that communicates with the lower end of the drip pan, the outer end of the drain pipe carrying a drain cock 35.

As clearly illustrated in Figure 1, the rear end of the water conducting pipe 12 is extended through the rear wall of the casing and communicates with the water chamber so that the water will be directly conducted to the faucet for use.

The chest is attached to the rear of the car body by means of a bracket 36, embodying a pair of horizontal rearwardly projecting arms bent at the rear ends to conform to the contour of the body and having openings for attachment with the body.

From the foregoing description and the drawings, it will be readily noted that a compact and durable chest has been provided, insulated to maintain the water and miscellaneous commodities therein in a sufficiently cold condition and arranged in association with a vehicle body so as to permit convenient use of the cooled water within the car. The chest has been constructed to provide a food containing compartment and a water compartment so as to maintain the water and food in proper condition for a comparatively long period of time.

It is to be understood that the form of my invention herein shown and described is to be taken as the preferred example of the same, and that various changes as to the shape, size and arrangement of parts may be resorted to without departing from the spirit of the invention or the scope of the subjoined claim. It should be further understood that the present water cooler and chest is adaptable for use other than upon automobiles or other vehicles without departing from the spirit of the invention.

Having thus described my invention, I claim:

A refrigerating attachment for automobiles comprising, in combination with the automobile body, a chest mounted upon the body, a wall of insulating material within the chest defining a water compartment having an open top, a closure for the top of the water compartment providing access to said compartment, the chest being open at its top; a closure for the said open top of the chest for access to the closure for the water compartment, an ice compartment arranged within the water compartment and supported upon the bottom thereof and spaced from the walls of the water compartment, the ice compartment having its upper end located near the upper end of the water compartment; a closure for the upper end of the ice compartment, means within the ice compartment near the bottom thereof for supporting ice within the compartment, a water outlet leading from the water compartment near the bottom thereof and through the wall of the body of the automobile upon which the attachment is mounted, a valve within the body of the automobile whereby the supply of water from the water compartment may be controlled, and a valved drain pipe leading from the ice compartment near the lower end thereof and beneath the ice supporting means therein and extending across the bottom portion of the water compartment and through the wall of the chest to the exterior thereof.

In testimony whereof I affix my signature.

ANNIE HARRISON.